United States Patent [19]

l'Anson

[11] 4,050,323
[45] Sept. 27, 1977

[54] PINTLE-TYPE INDUSTRIAL CONVEYOR CHAIN

[76] Inventor: Thomas l'Anson, 4014 Hunts Point Road, Bellevue, Wash. 98004

[21] Appl. No.: 648,457

[22] Filed: Jan. 12, 1976

[51] Int. Cl.² .................. F16G 15/12; B65G 17/40
[52] U.S. Cl. ............................. 74/251 C; 59/84; 59/90
[58] Field of Search ............ 59/84, 78, 90, 35, 35 PC; 198/189; 74/245 C, 250 R, 250 C, 251 C

[56] References Cited
U.S. PATENT DOCUMENTS

| 670,285 | 3/1901 | Levalley | 198/189 |
| 3,665,704 | 5/1972 | Trudeau | 198/189 |

FOREIGN PATENT DOCUMENTS

| 2,150,078 | 10/1971 | Germany | 59/90 |
| 372,243 | 11/1963 | Switzerland | 59/90 |

Primary Examiner—C.W. Lanham
Assistant Examiner—Gene P. Crosby
Attorney, Agent, or Firm—Christensen, O'Connor, Garrison & Havelka

[57] ABSTRACT

Industrial conveyor chains of pintle-connected types featuring stub journals removably interengageable with socket bearings through access leads which provide increased bearing surface area and shear strength in the pivoted connections relieving the connecting pins of all or a major role in the bearing and load carrying functions of the link couplings.

5 Claims, 8 Drawing Figures

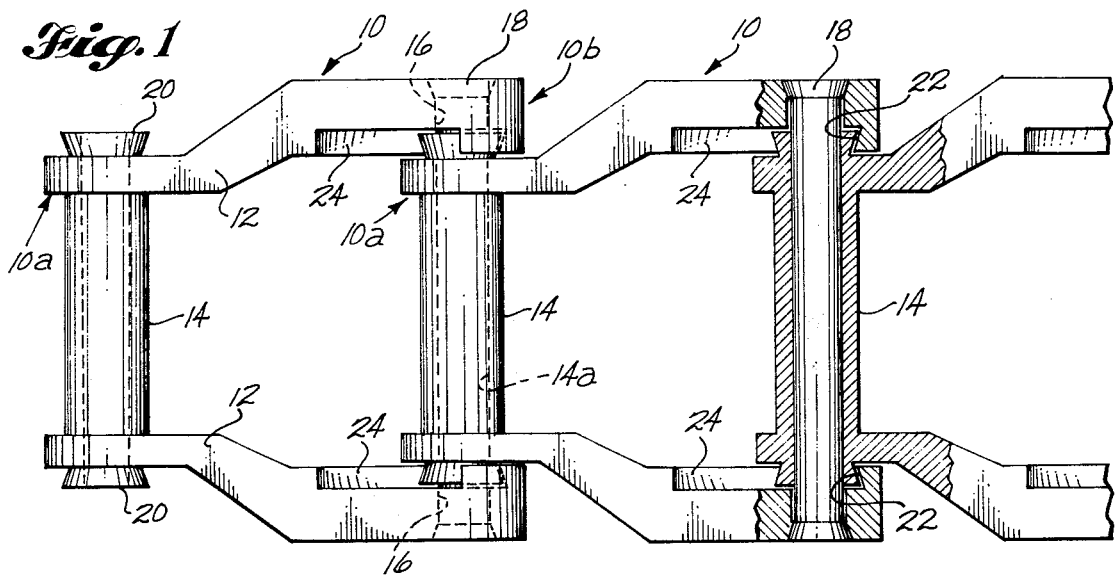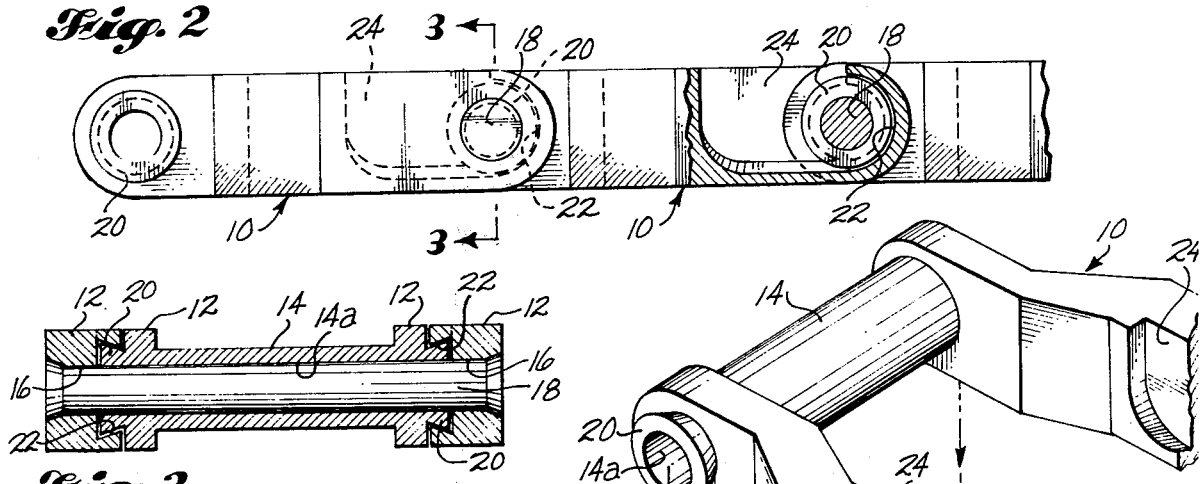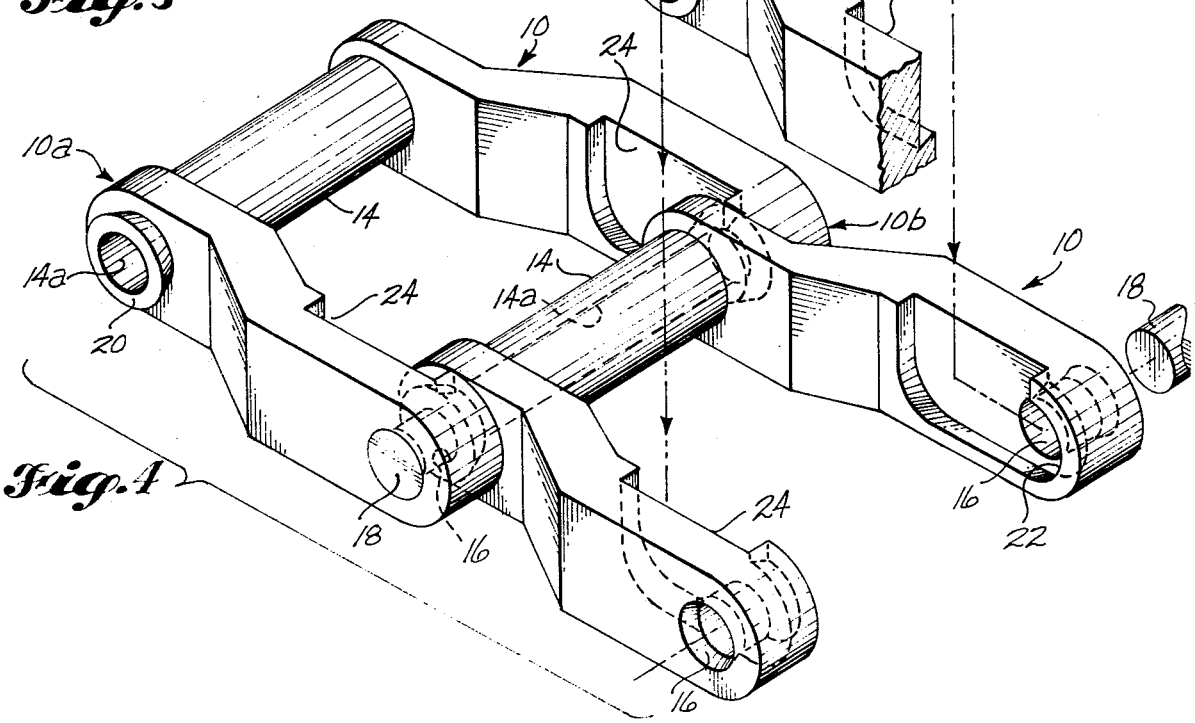

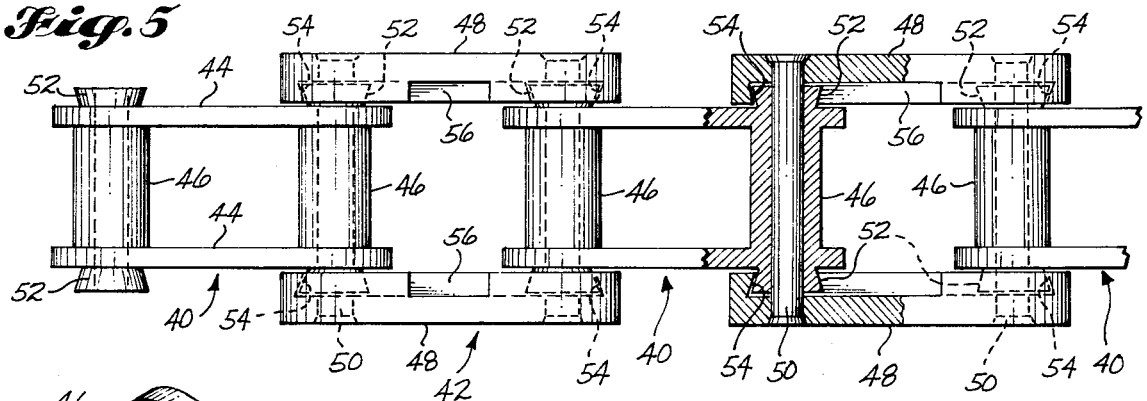
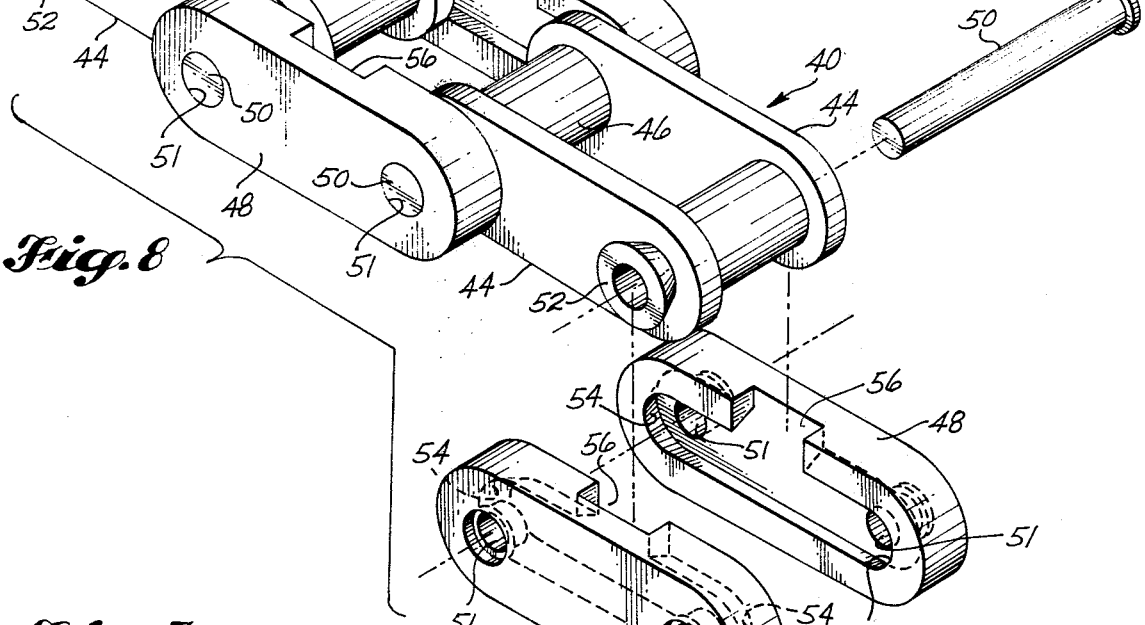
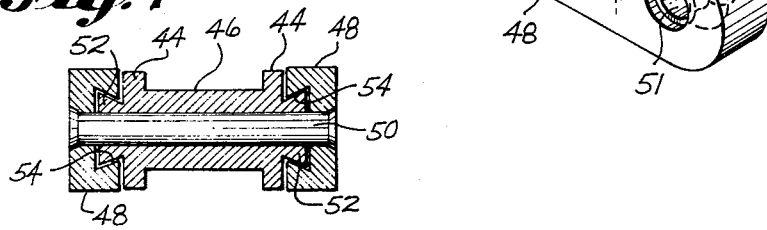
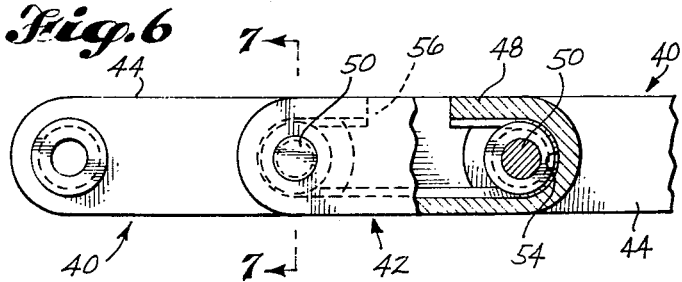

PINTLE-TYPE INDUSTRIAL CONVEYOR CHAIN

BACKGROUND OF INVENTION

This invention relates to improvements that greatly extend the wear life and increase the load strength of pintle-type industrial conveyor chains, and more particularly that achieve these ends without restricting the adaptability or versatility of chain form to various uses, adding to exterior bulk or objectionably increasing initial chain cost. The invention is herein illustratively described by reference to the presently preferred form thereof embodied in otherwise conventional C-type and H-type industrial conveyor chains; however it will be recognized that various changes and modifications therein may be made without departing from the essential features involved.

Pin wear and pin breakage susceptability of conventional chains of the types generally used in industrial conveyor operations are serious problems. Not only do they present an economic problem in terms of chain cost initially and in making repairs, but there is a greater cost and disaccommodation experienced in many used due to downtime of a plant when a critical process conveyor breaks unexpectedly under load. Frequent inspections are necessary to determine chain pintle condition, the pintles or pins usually being the critical part that breaks after wear and/or crystallization due to repeated flexure stresses under load. Visual inspections are at best difficult and unreliable, however, unless the conveyor is dismantled and the parts separately examined and/or tested. In most plants a procedure as elaborate and time consuming as this is not feasible, so the all too-common practice is to operate a conveyor line until it breaks or until a weekend, holiday or other convenient shutdown time when careful inspections and repairs or replacements can be made.

A further object of this invention is to provide wear extending, strengthening coupling means between links of such chains that can be more easily inspected visibly without fully disassembling the chain, that can be more easily repaired by weld-on deposits of metal in worn places when need by, and that can be expected generally to multiply the trouble-free, full-strength working life of such chains severalfold.

Another object hereof is to provide such link coupling improvements in such chains that also strengthen the chain links in another respect, normally through inherent exertion of selfcompacting forces when under load that eliminate spreading and breaking tendencies that end chamferring type of wear can cause in conventional pintle-type chains after pins wear thin and a looseness develops that can permits spreading apart of opposed link bar ends until there is failure.

A further object hereof is to so modify the coupling means in such chains as to greatly increase the working areas of the interengaged bearing surfaces such that stresses are not concentrated and actual wear per unit area is greatly reduced, yet without significantly increasing the amount of material in the chain or its external bulk, or presenting limitations on the kinds, shapes and sizes of fittings and attachments that may be mounted on or carried by such chains, or on the driving and guiding mechanisms working with them.

SUMMARY OF FEATURES

In accordance with this invention, chain link coupling load is borne and/or shared with the coupling pin by short journals coaxial therewith projecting laterally outward from the inside link side bars into complemental socket bearings formed in the inside faces of the outside or straddling link bars enterable through relief passages or leads in assembly of the chain. These short journals and their mated socket bearings are preferably conical-divergent so as to wedge the straddling links inward as a function of increasing tension loading in the drain to make a self-compacting assembly.

By initially sizing the short journals and socket bearings to interengage as bearing surfaces before the connecting pin and socket surfaces interengage when the chain is placed in tension, significant and consistent loading of the latter when the chain is working can be deferred to a controlled wear point in the operating life of the chain. When sufficient wear of these auxilliary (journal and bearing) surfaces has occurred, the pin can then start to assume a share of load, the proportions with which the two sets of bearing surfaces eventually share the wear stabilizing in accordance with their respective surface areas placed under bearing load. Likewise the shear load borne by the chain coupling is shared between the pin and the short journals concentric therewith, adding greatly to the loadable strength of the link couplings.

These and other objects, features and advantages of the invention will be recognized from an understanding of the preferred embodiments hereinafter discussed.

Description of Drawings

FIG. 1 is a face view of a length of H-type industrial conveyor chain shown partly in section modified in accordance with the invention.

FIG. 2 is a side edge view of the same also shown partly in section.

FIG. 3 is a transverse fragmentary section taken on line 3–3 in FIG. 1.

FIG. 4 is an isometric view of a length of the same chain with one link and a tie bolt, both shown fragmentarily, in detached position ready to be joined to an end link of the assembled chain.

FIG. 5 is a face view of a length of C-type industrial conveyor chain shown partly in section modified in accordance with the invention.

FIG. 6 is a side view of the same also shown partly in section.

FIG. 7 is a transverse fragmentary section taken on line 7—7 in FIG. 5.

FIG. 8 is an isometric view of a length of the same chain with one pair of link bars and a tie bolt in detached position ready to be joined to an end link of the assembled chain.

DETAILED DESCRIPTION OF THE PREFERRED EMBODIMENTS

In FIGS. 1–4 the H-type chain links 10, of any suitable metal or alloy, are typically cast, each link identical to every other link in the chain, or different from others if desired, such as if attachments are contemplated for some and not for others. Each link illustrated comprises two transversely spaced parallel side bars 12 of jogged or dog-leg form rigidly cross-connected at one end by a spacer of tubular form 14 to form a link that is wider at its opposite, open end. The transverse outside width at each link's narrow end 10a is accommodated by the inside width of the adjoining link's wide end 10b, the sides of which overlap and confront the respective sides of the first link with a clearance that is slight but sufficient to afford practical manufacturing tolerance as is also customary with conventional H-type chains.

As with conventional H-type chains, here also in the preferred improvement embodiment of an H-type chain, the link bars at the wide end of the link may also have chamfer-counterbored rivet holes 16 that register with the spacer tube bore 14a of the adjoining link to pass a pin (pintle) or rivet 18 that connects the links together pivotally. Conventionally chain load is transmitted from link to link entirely by this pin 18 loaded in shear at the two link bar interfaces, half the load being thus borne at each side interface between the coupled links. Also conventionally bearing surface wear accompanying pivoting and other relative working movements between connected links is borne entirely by the surface area of connecting pin 18 bearing slidably on the walls of bar end holes 16 and tube bore 14a. The patterns of wear on these surfaces tend to vary and tend to progress often unevenly, until after wear-reduced pin cross section and crystallization weakening of repeatedly stress cycled pin metal at a link bar interface, a pin breaks. Replacement with a new pin restores the chain to working order, but old wear patterns in the link holes more quickly wear out the new pin than the original and eventually the chain must be scrapped or rebuilt with weld fillets and reboring.

With the present improvement the reliable wear life of a chain is greatly extended and the problem of breakdowns due to pin failure solved by the improved link couplings that considerable increase the load transmitting shear cross section and bearing surface wearing areas therein by a means that relieves the connecting pin of these responsibilities either wholly or partially. To these and related ends stub journals 20 project outward from opposite sides of the narrow end of each link in coaxial alignment with the cross tube 14. The central bore through tube 14 continues through the stub journals 20 to pass the usual connecting pin 18 when the chain is assembled. Journals 20 are received in conformably shaped socket bearing 22 formed in the inside faces of the link bars at the wise end and accessible via entrance leads 24 each extending from an edge laterally, thence longitudinally, of the bar. Socket bearing 22 and entrance leads 24 reduce the net working cross section of the link bars where material is removed to form them; however it is a simple matter to design the links for adequate tensional load strength in every transverse plane following conventional practice.

Preferably short journals 20 are of coincally divergent form as are the conformed socket bearings with a sufficient cone angle (such as from 30° for small or narrow to 10° for large or wide chains) to have a wedging effect tending to draw together the link bars which these mating journal and bearing elements interconnect with a force proportional to chain loading. This feature helps maintain even distribution of bearing and journal surface wear over the chain's working life, and also strengthens the chain against the effects of a tendency in conventional chains for spreading of the link bars at the wide end under heavy loading after wear and especially unbalanced heavy loading of the links.

Preferably journals 20 are full circle annuli for purposes of maximizing their shear load strength, but they may be segmental if desired since the bearing area need extend only over a lesser circular arc to assume bearing load.

Preferably also in the relative sizing of the short stub journals and socket bearings these surfaces come together under chain load a few thousandths of an inch ahead of the connecting pin in its bore holes when the chain is new. Then as the chain wears and more particularly the journal and bearing surfaces wear, the pin itself starts to share the wear and the load. As the chain's use continues thereafter some sharing of the load between the two sets of bearing surfaces, one set comprising those of the connecting pin and the bore walls on which it slides and the other set comprising those of the pairs of short journals and the cooperating socket bearing forces which seat them. Both the body of material in the pin and the body of material in the short journals stand (share) the chain load forces that must be transmitted between links and are available to that end in such excess of actual need that attrition due to corrosion and wear is not critical to the useful life of the chain. Furthermore the exposed and readily accessible surfaces of the short journals and socket bearings with the links disconnected facilitates repair and renewal by adding and grinding smooth weld-on material where wear does occur. Thus without materially increasing the exterior bulk or unduly adding to the cost and complexity of such chains, and without materially limiting the adaptability and flexibility of the chain to various uses and to accommodate various attachments and special requirements of shape, this invention greatly strengthens and greatly extends the useful wear life of the chain and thus in the long run provides considerably economic savings in terms of lower overall chain costs and more importantly in terms of reduced downtime in the industrial processes served by such chains.

In FIGS. 5-8 the invention is shown embodied in an otherwise conventional C-type pintle chain consisting of alternately narrow straight-bar links 40 and wide straight-bar links 42. Commonly cast in one piece, narrow links 40 comprise flat straight side bars 44 cross-connected at opposite ends in parallel relationship by tubular spacers 46. Wide links 42 are comprised of a pair or bars 48 having end holes to permit connecting these bars pivotally to the ends of adjacent links 40 by means of pins or rivets 50.

In applying the pinciples of the invention to such a chain, two pairs of conically divergent short stub journals 52 are molded on the outer sides of links 40 coaxially with the spacer tubes 46. Complemental socket bearings 54 coaxial with pin bores 51 are formed in opposite ends on the inside faces of link bars 48. To these, access is gained for entry by journals 52 through an intermediate entrance lead 56 that extends laterally inward from a bar's edge, and then branches oppositely to extend longitudinally of the bar into the respective socket bearings 54 at the ends of the bar.

I claim:

1. A chain for industrial conveyors and the like comprising a succession of links pivotally interconnected including a first link and an adjoining second link having mutually adjacent ends each with transversely opposite side portions overlappingly confronting and pivotally joined to the respective side portions of the other by sets of pivotally engaged connecting elements formed integrally with the respective link side portions, said sets of connecting elements each comprising a stub journal porjecting transversely from one such side portion and a socket bearing, conformed to and pivotally receiving said stub jorunal, said projecting stub journals being of conically divergent form and the socket bearings being of complemental conically convergent form.

2. The chain defined in claim 1 wherein the socket bearings are of circular segmental form, thereby to seat the stub journals, said socket bearings opening endwise of the associated link side portions into an entrance lead that extends from such socket bearing endwise and laterally of such side portion to an edge of such side portion to pass said stub journal for entering and leaving such socket bearing in assembling and disassembling of the chain.

3. The chain defined in claim 2 and a pivot pin passing through and interconnecting said overlapping ends coaxially with said stub journals.

4. The chain defined in claim 3 wherein the chain is of the H-type with interengaged first and second links, one having a widely spaced end portion straddling and pin-connected to end portions of the other which are narrowly spaced to be thus straddled, the stub journals projecting transversely outward from opposite sides of the link end with narrowly spaced side portions coaxial with the pin connection.

5. The chain defined in claim 3 wherein the chain is of the C-type with interengaged links alternately having widely spaced and closely spaced parallel side bars, the end portions of alternate links straddling and being pin-connected to the end portions of the closely spaced side bars of the intervening links, with the stub journals projecting transversely outward from the opposite end portions of said intervening links.

* * * * *